United States Patent

Krüger et al.

[11] Patent Number: 5,809,892
[45] Date of Patent: Sep. 22, 1998

[54] WEB-THREADING OR INFEEDING DEVICE FOR A MACHINE PROCESSING WEB-SHAPED MATERIAL, IN PARTICULAR A WEB-FED ROTARY PRINTING MACHINE, AND METHOD OF THREADING A WEB OF MATERIAL INTO SUCH A MACHINE

[75] Inventors: Michael Krüger, Edingen-Neckarhausen; Hans Jöorg Laubscher, Neustadt-Gimmeldingen, both of Germany

[73] Assignee: Heidelberger Druckmaschinen AG, Heidelberg, Germany

[21] Appl. No.: 865,088

[22] Filed: May 29, 1997

[30] Foreign Application Priority Data

May 29, 1996 [DE] Germany .................. 196 21 507.2

[51] Int. Cl.⁶ .................. B41F 13/02; G03B 1/56
[52] U.S. Cl. .................. 101/483; 101/228; 226/92; 310/12; 318/135
[58] Field of Search .................. 101/483, 181, 101/226, 228; 226/92, 91; 310/12; 318/135

[56] References Cited

U.S. PATENT DOCUMENTS

| 3,680,755 | 8/1972 | Foor et al. | 226/91 |
|---|---|---|---|
| 3,761,001 | 9/1973 | Bolza-Schunemann et al. | 226/92 |
| 3,995,553 | 12/1976 | Winterholler et al. | 101/228 |
| 4,081,723 | 3/1978 | Vetter et al. | |
| 4,335,858 | 6/1982 | Cranna | 226/91 |
| 4,706,862 | 11/1987 | Theilacker | 226/92 |
| 4,987,830 | 1/1991 | Fukuda er al. | 101/228 |
| 5,003,884 | 4/1991 | Glunz et al. | 101/228 |
| 5,047,676 | 9/1991 | Ichikawa . | |
| 5,152,471 | 10/1992 | Goerner | 226/92 |
| 5,263,414 | 11/1993 | Lehrrieder et al. | 101/228 |
| 5,307,970 | 5/1994 | Shibuya et al. | 226/92 |
| 5,400,940 | 3/1995 | Sato et al. | 226/92 |

FOREIGN PATENT DOCUMENTS

| 0 425 741 A1 | 5/1991 | European Pat. Off. . |
| 2 021 246 | 12/1971 | Germany . |
| 25 01 963 | 12/1975 | Germany . |
| 33 08 068 C1 | 8/1984 | Germany . |
| 263 262 A1 | 12/1988 | Germany . |
| 41 22 228 C2 | 4/1993 | Germany . |

Primary Examiner—Eugene H. Eickholt
Attorney, Agent, or Firm—Herbert L. Lerner; Laurence A. Greenberg

[57] ABSTRACT

A threading device for a machine for processing web-shaped material, having a guide rail extending at least sectionwise through the machine, includes a pulling device movable along the guide rail for pulling a web behind it, and an electric linear drive for activating the pulling device; and a method of threading the web through the processing machine.

25 Claims, 7 Drawing Sheets

WEB-THREADING OR INFEEDING DEVICE FOR A MACHINE PROCESSING WEB-SHAPED MATERIAL, IN PARTICULAR A WEB-FED ROTARY PRINTING MACHINE, AND METHOD OF THREADING A WEB OF MATERIAL INTO SUCH A MACHINE

BACKGROUND OF THE INVENTION

FIELD OF THE INVENTION

The invention relates to a web-threading or infeeding device for a machine processing web-shaped material, in particular a web-fed rotary printing machine, and to a method of threading or infeeding a web OF material into such a machine.

Web-threading devices for printing machines have become known heretofore. They are used, when a paper web to be printed is being inserted or after a break in the web has occurred, for automatically threading or pulling a starting end of the web through thereafter-following sections of the printing machine, i.e., for example, from a reel stand through individual printing units, a drier section and a cooling section, along a predefined track section.

The published German Patent Document DE 41 22 228 C2 discloses a web threading device which is formed of a pulling device movable along a guide rail. In this regard, the pulling device is formed of a plurality of individual links which are connected to one another via a coupling rod and are respectively driven via electric motors and appertaining rollers. The power supply to the electric motors is provided via a bus bar or power rail running in the guide rail and power pick-ups arranged on the links.

German Patent 20 21 246 describes a web-threading device wherein a motorized carriage or motor car equipped with an electric drive motor drives along a rack guide, a gear driven on the electric drive motor being in meshing engagement with the rack.

The published German Democratic Republic Patent Document DD 263 262 A1 describes a device for infeeding or threading material webs into rotary printing machines, wherein the material web is pulled by an electrically driven motorized carriage, which is accommodated or held by guides having a boxlike profile. The motorized carriage has a steering device at an end thereof and at least two drive rollers which are offset from one another in the direction of movement thereof.

The published European Patent Document EP 0425741 A1 discloses a web-threading device which has a pulling device formed of a flexible guide piece which is moved along a guide rail by drive stations arranged at spaced distances from one another on the guide rail. In this regard, the guide piece is driven by rollers in the drive stations, which act upon the guide piece through openings formed in the guide rail, the spaced distances between the drive stations being slightly smaller than the length of the flexible guide piece.

The aforedescribed heretofore-known web-threading devices have comparatively large frictional losses and correspondingly high wear because of the drive principle thereof, which is based upon a formlocking and frictional connection, and because of the numerous moving parts thereof. In this regard, it is noted that a formlocking connection is a connection of two elements resulting from the shape of the elements themselves, as opposed to a force-locking connection whereby the elements are locked together by force external to the elements. In addition, the device outlay and costs are increased due to the numerous moving parts. Moreover, the conveyor stations for the last-mentioned device require a great amount of space. Finally, in the case of the aforementioned devices according to the state of the art, there is a risk that disturbances or disruptions in operation may occur even due to a slight soiling of the guide rails and of the pulling device, respectively.

SUMMARY OF THE INVENTION

It is accordingly an object of the invention to provide a web-threading device for a machine processing web-shaped material, in particular a web-fed rotary printing machine, as well as a web-threading method, which avoids the aforementioned disadvantages of the corresponding prior-art devices.

With the foregoing and other objects in view, there is provided, in accordance with one aspect of the invention, a method of threading a material web into a machine for processing web-shaped material, which comprises driving a rail-guided pulling device by direct action of magnetic forces, and having the pulling device pull a web behind it.

In accordance with another aspect of the invention, there is provided a threading device for a machine for processing web-shaped material, having a guide rail extending at least sectionwise through the machine, comprising a pulling device movable along the guide rail for pulling a web behind it, and an electric linear drive for activating the pulling device.

In accordance with a further aspect of the invention, the pulling device forms a rotor of the linear drive.

In accordance with an added feature of the invention, the threading device includes electrically excitable coils forming a stator of the linear drive, the coils being arranged along the guide rail.

In accordance with an additional feature of the invention, the pulling device has at least one structural feature selected from the group thereof consisting of a magnetizable material containing inhomogeneities, permanent magnets and closed electrically excitable coils, so that when coils of the guide rail are excited, the pulling device is driven forward.

In accordance with yet another feature of the invention, the pulling device has at least one coil for generating an alternating primary field.

In accordance with yet a further feature of the invention, the guide rail has at least one structural feature selected from the group thereof consisting of a magnetizable material with openings arranged therein, permanent magnets and electrically excitable coils so that when the at least one coil of the pulling device is excited, the pulling device is driven forward.

In accordance with yet an added feature of the invention, the threading device includes a power supply for the at least one coil of the pulling device, power being supplied thereby via an accumulator provided in the pulling device.

In accordance with yet an additional feature of the invention, the threading device includes power supply lines disposed in the guide rail, the at least one coil of the pulling device being excitable via an electric contact actuatable by the pulling device and the power supply lines.

In accordance with still another feature of the invention, the pulling device is formed as a guiding device extending along a section of the guide rail, and the threading device includes drive stations disposed sectionwise along the guide rail, the drive stations being provided with electrically excitable coils, the pulling device having a length slightly greater than a spaced distance between respective pairs of the drive stations.

In accordance with still a further feature of the invention, the pulling device is formed with an elongated body matchable with the profile of the guide rail.

In accordance with still an added feature of the invention, the pulling device has at least one structural feature selected from the group thereof consisting of a magnetizable material containing inhomogeneities, permanent magnets and closed coils electrically excitable by the primary field of the coils of the drive stations, so that when the coils of the drive stations are excited, the pulling device is driven forward.

In accordance with still an additional feature of the invention, the pulling device is formed as a link chain.

In accordance with another feature of the invention, the link chain is formed exclusively of permanent magnets joined to one another by articulating joints.

In accordance with a further feature of the invention, the threading device includes a first detection device for activating a work station when the pulling device enters one of the drive stations, respectively.

In accordance with an added feature of the invention, the threading device includes a control device for controlling forward driving of the pulling device.

In accordance with an additional feature of the invention, the threading device includes second detection devices provided along the guide rail, in accordance with the function of which the forward driving of the pulling device is controllable by the control device.

In accordance with yet another feature of the invention, the threading device includes at least one switch by which the pulling device is guidable along different web paths.

In accordance with yet a further feature of the invention, the guide rail has a cross section which is selected from the group consisting of substantially C-shaped and T-shaped cross sections.

In accordance with yet an added feature of the invention, the threading device includes at least one structural feature selected from the group consisting of rollers and guide surfaces provided in the guide rail for guiding the pulling device.

In accordance with yet an additional feature of the invention, the coils are supplied by a voltage selected from the groups thereof consisting of AC and DC voltages.

In accordance with still another feature of the invention, the coils are supplied by a voltage selected from the groups thereof consisting of AC and DC voltages.

In accordance with still a further feature of the invention, the coils along the guide rail are activatable in sections, the respective section which is activated being exclusively the section wherein the pulling device is then located.

In accordance with a concomitant feature of the invention, the stator is matched to a track profile of the guide rail.

The threading device according to the invention offers, in particular, the advantage that it may be produced and operated in a cost-effective manner and that it has high accuracy in the positioning of the pulling device and great constancy in the pulling force to be generated. Furthermore, the threading device has only a low energy requirement for operation and requires virtually no maintenance. In addition, even in the event of a severe external action of dirt, there exists only a low risk of operational disturbances, which might be caused, for example, by clogging or obstruction of the guide rail.

Other features which are considered as characteristic for the invention are set forth in the appended claims.

Although the invention is illustrated and described herein as embodied in a web-threading device for a machine processing web-shaped material, in particular a web-fed rotary printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
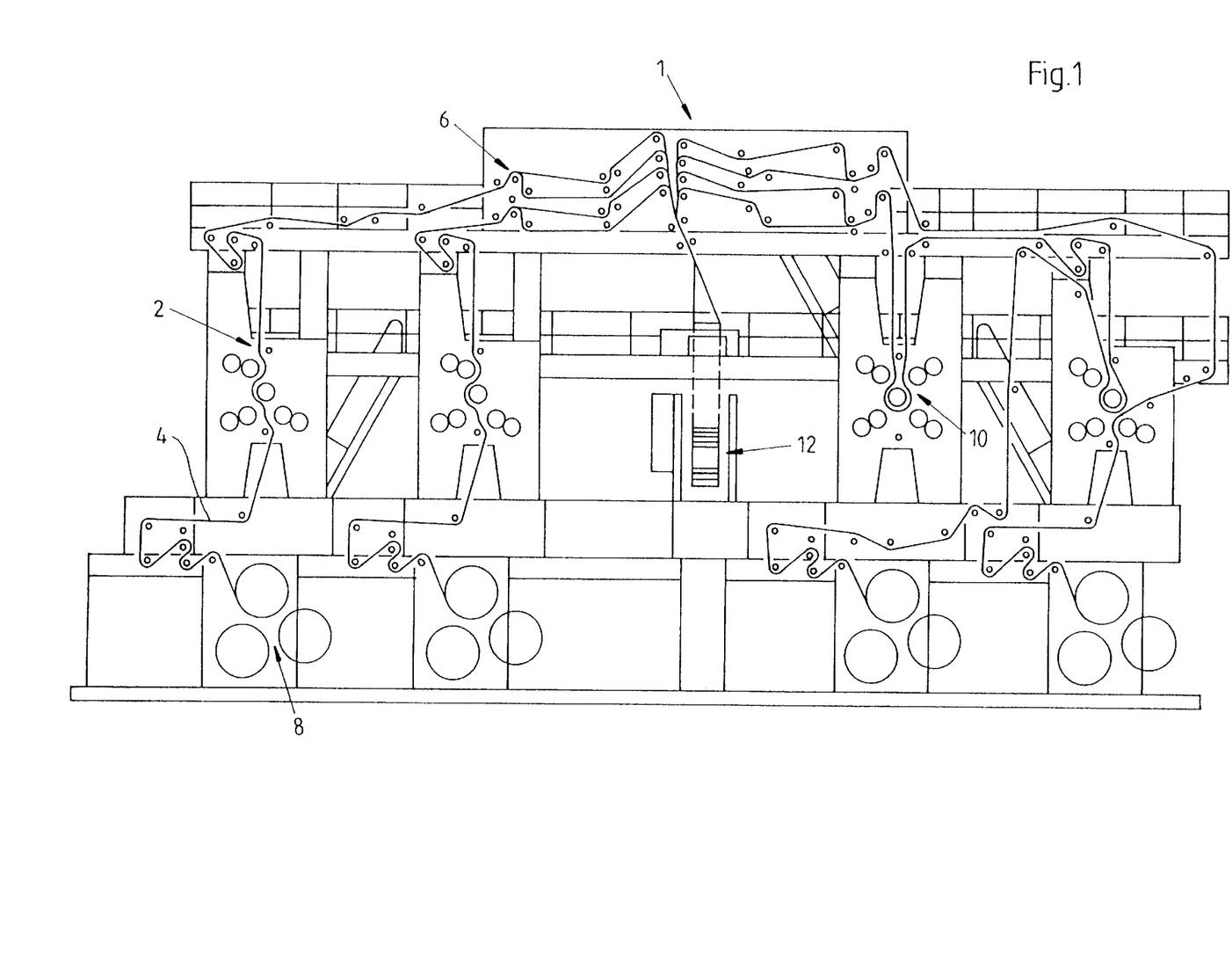
FIG. 1 is a highly diagrammatic side elevational view of a web-fed rotary offset printing machine having various web paths and including a web-threading device according to the invention.

Referring now to the drawing and, first, particularly to FIG. 1 thereof, there is illustrated therein a printing machine 1, for example, a web-fed rotary offset printing machine for printing web-shaped material, which includes a web-threading or infeeding device 2, with which the web-shaped material 4 can be threaded or pulled into the printing machine 1, along a web path 6 depending upon the respective print job, from a reel stand 8 of the printing machine, through individual printing units 10, and to a folding apparatus 12.

Figure 2:
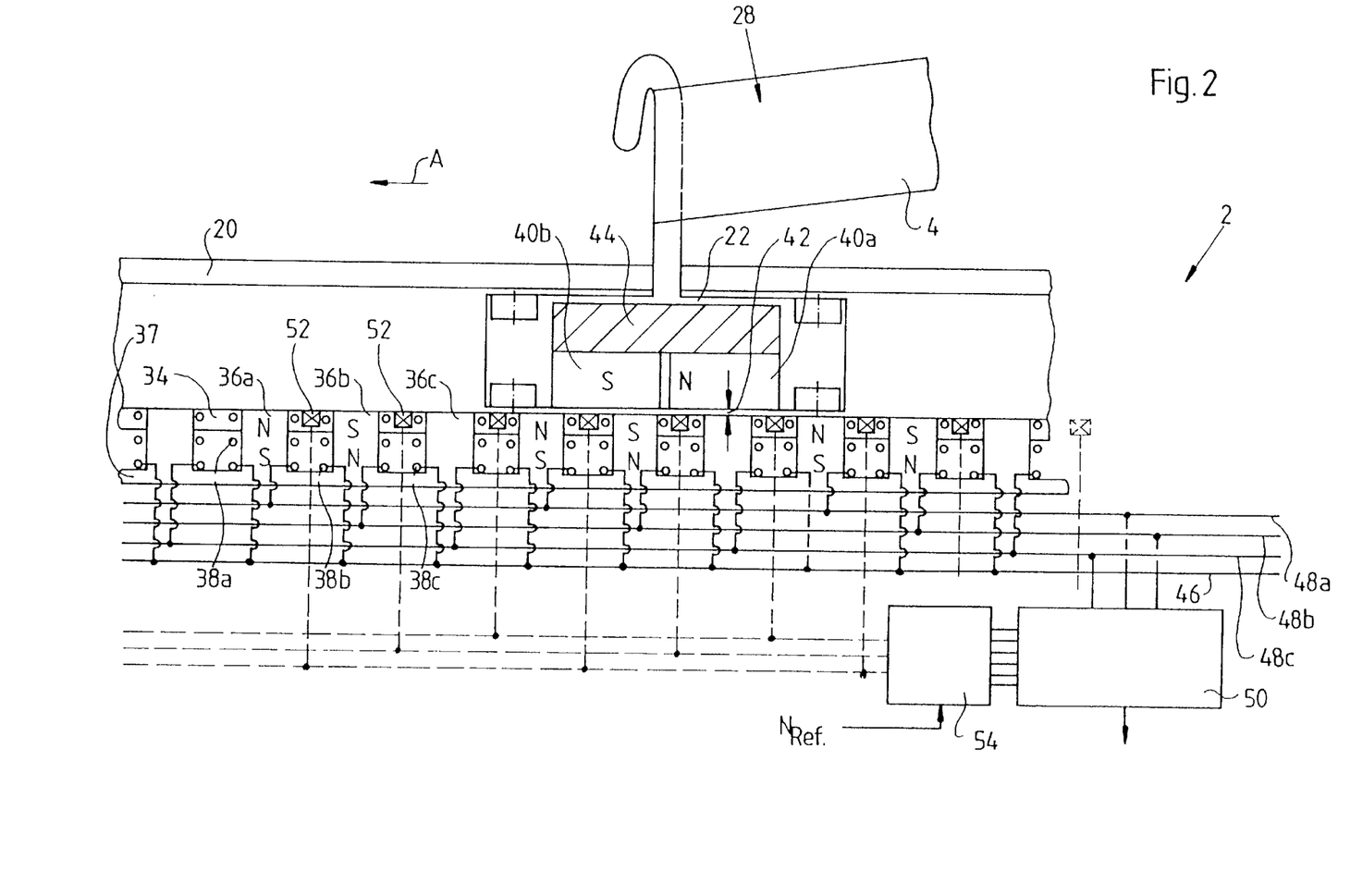
FIG. 2 is a fragmentary diagrammatic longitudinal sectional view of a guide rail according to the invention and a pulling device provided therein.
Figure 3:
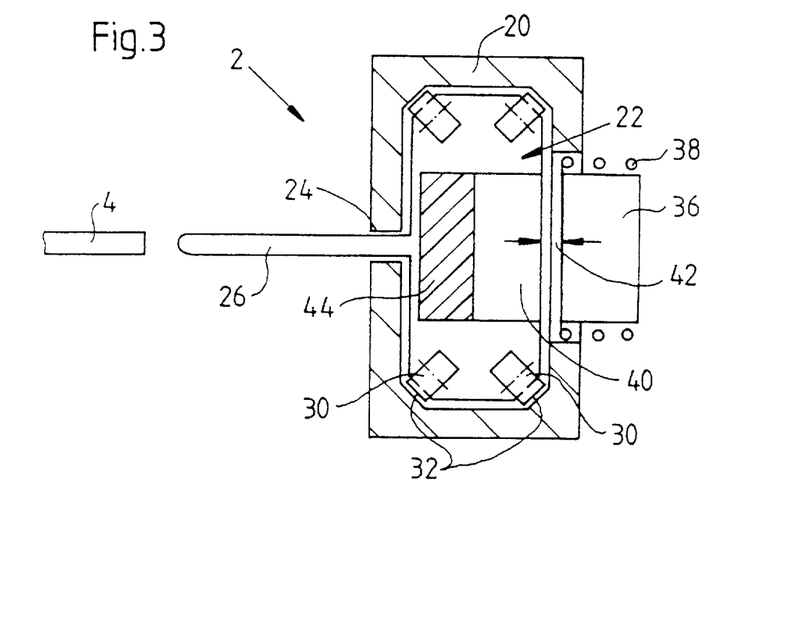
FIG. 3 is a diagrammatic cross-sectional view, rotated through 90°, of the guide rail of FIG. 2.

As shown in FIGS. 2 and 3, the web threading device 2 according to the invention has a guide rail 20, which runs, laterally adjacent or alongside the web-shaped material 4, through the printing machine 1 along the web path 6 in a conventional manner, and which, in the preferred embodiment of the invention, has a substantially C-shaped cross section. The cross-sectional shape of the guide rail is not restricted to the aforementioned C shape, however, but can in principle have any desired shape, for example, a circular, oval or polygonal shape.

Located within the guide rail 20 is a pulling device 22, which is movable in the longitudinal direction of the guide rail 20, and has, on the side thereof facing towards the web-shaped material 4, a projection 26 which extends through a longitudinal opening 24 formed in the guide rail 20, a leading end 28 of the web-shaped material 4 being fastened to the projection 26, for example, by means of a non-illustrated adhesive tape. In the preferred embodiment of the invention, the pulling device 22 is guided in the guide rail 20 with the aid of rollers 30 which are supported on appertaining contact surfaces 32 formed inside the guide rail 20 and thereby ensure a reliable and play-free guidance of the pulling device 22. In the preferred embodiment of the invention, at both ends of the pulling device 22, there are provided preferably four guide rollers 30, respectively, which are arranged inclined at an angle of 45° to the side walls of the guide rail 20 and which are guided on correspondingly inclined contact surfaces 32 of the guide rail 20. Due to this construction of the pulling device 20 according to the invention, for a minimum outlay on the number of rollers and, accordingly, a minimum outlay on the device, there results a maximum tilting security against the tilting moments acting upon the pulling device 22 when the web is pulled in over the projection 26. Due to this arrangement, a free-running and secure guidance of the pulling device 22 within the guide rail 20 is always assured. Instead of the rollers arranged inclined at an angle to the side walls of the guide rail 20, it is also possible, however, to provide rollers 30 running in the same manner vertically on the inner surfaces of the guide rail 20, for example three, four or more rollers 30 on each side. In addition, the angle at which the rollers 30 are inclined is not restricted to the 45° which is described, but can in principle have any desired value between 0° and 90° with respect to the vertical.

As illustrated in FIG. 2, opposite a longitudinal opening 24 is a side wall 34 of the guide rail 20, wherein there are arranged electromagnets 36 which can be formed in a conventional manner from an otherwise non-illustrated core made of magnetizable material, preferably of ferromagnetic material, and a coil 38 wound around the core. The cores of the electromagnets 36 can be connected to one another on one side thereof by a pole lamination or plate 37, as shown in FIG. 2.

Fastened to the pulling device 22 are two or more permanent magnets 40a and 40b having first poles arranged, as viewed in the longitudinal direction of the pulling device 22, alternately lying alongside one another (north/south) in such a manner that they lie opposite the poles of the electromagnets 36 in the guide rail 20. The position of the permanent magnets 40a and 40b of the pulling device 22 and the position of the electromagnets 36 of the guide rail 20 are selected so that a well-defined gap 42, which has a magnitude of 0.5 mm, for example, results between the first poles of the permanent magnets 40a and 40b and the poles of the electromagnets 36. The lateral distance between adjacent electromagnets 36 is substantially constant on the rectilinearly extending sections of the guide rail 20. In the curved regions of the guide rail 20, the lateral distance and the construction of the electromagnets 36, and the coils 38, respectively, which in this case form the stator of the linear drive, is preferably matched to the web profile. The second poles of the permanent magnets 40a and 40b in the preferred embodiment of the invention are connected by a common pole lamination or plate 44 made of magnetizable material, preferably soft iron. As illustrated in FIG. 2, in the preferred embodiment of the invention, the distance between the electromagnets 36 is selected so that, respectively, three of the electromagnets 36, for example the magnets 36a, 36b and 36c in FIG. 2, lie directly opposite the two permanent magnets 40a and 40b. This results in a so-called division ratio of 2:3. However, the division ratio is not restricted to the aforementioned value of 2:3 but can in principle have any desired value.

As illustrated in FIG. 2, the respective first ends of the coils 38 of the electromagnets 36 are connected to one another by a common electric connecting line 46. The second ends of each fourth coil 38 are supplied with power in groups via appropriate common lines 48a, 48b and 48c. Due to this groupwise wiring of the electromagnets 36, a total of only four lines 46, 48a, 48b and 48c is necessary in order to supply the electromagnets 36 with power so that a forward drive motion of the pulling device 22 in the direction of the arrow A along the guide rail 20 results. The alternate powering of the coils 38 of the electromagnets 36 which is required for a forward thrust or advance of the pulling device 22 is performed in a conventional manner by a conventional converter 50, which is therefore not described in any greater detail hereinbelow. In the preferred embodiment of the invention, the converter 50 supplies the coils 38 of the electromagnets and the groups of electromagnets 36, respectively, alternately with an appropriate DC voltage. In the same manner, however, supplying the electromagnets 36 and the groups of electromagnets 36, respectively, with an AC voltage is also possible. It is further possible to supply the coils 38 of the electromagnets 36, respectively, with power separately via individual feed lines.

In the preferred embodiment of the invention, sensors 52 are provided between the electromagnets 36 for detecting the respective physical position and/or speed of the pulling device 22 and for feeding these values to a control device 54 connected upstream of the converter 50, the control device being of conventional construction for comparing the physical position and/or the speed of the pulling device 22 with a predefined reference value Nref and for controlling the converter 50 in accordance with or as a function of this reference value. In the same manner as the electromagnets 36, the sensors 52 can be connected in groups, via connecting lines which are not shown in greater detail, to the control device 54, in order to achieve a reduction in the number of lines. The reference value Nref can be predefined, for example, by the central control device of the printing machine during the automatic threading of the web-like material 4. However, it is also conceivable for the pressman to enter this reference value Nref by hand, for example via a remote control or similar device, during the process of threading the material web 4 into the printing machine, and/or to be able to alter the reference value by hand, for example in order to increase the speed of the pulling device 22, while he or she is simultaneously following the threading operation from the outside.

Furthermore, it may be advantageous to supply the power to the groups of electromagnets 36 only sectionwise by subsections having, for example, 50 or 100 electromagnets 36, and not to activate all the electromagnets 36 over the entire length of the guide rail 20 during the threading operation. The control of the individual sections of the web-threading device 2 can thereby be performed, for example, by activating a section of the guide rail 20 disposed in the forward drive direction of the pulling device 22 only shortly before the entry of the pulling device 22 into this section, and by deactivating the preceding section in a corresponding manner, after the pulling device 22 has left the latter. The activation of the sections can accordingly be performed via sensors which are not otherwise illustrated in greater detail in the drawings, or also via the sensors 52.

The web-threading device 2 according to the invention has been described hereinbefore with respect to a preferred exemplary embodiment wherein permanent magnets 40*a* and 40*b* are arranged in the pulling device 22, and electromagnets 36 with coils 38 are arranged on the guide rail 20. However, in the same manner, it is conceivable to use any desired conventional linear drive principle for moving the pulling device 22. In principle, the guide rail 20 forms the stator, and the pulling device 22 forms the rotor of such a conventional linear drive.

Thus, for example, it is possible for the pulling device 22, instead of or in addition to the permanent magnets 40*a* and 40*b*, to contain closed, electrically excitable coils or, in the simplest case, to be formed of a magnetizable material containing inhomogeneities. For example, the pulling device 22 may be formed of a transformer lamination or plate provided with openings arranged at uniform distances from one another.

In a corresponding manner, provision may be made for the electromagnets 36 which are alternately excited and generate the primary field for the forward drive of the pulling device 22, and the coils 38 thereof, respectively, not to be arranged on the guide rail 20, but rather, to be integrated into the pulling device 22. Power can be supplied to the pulling device 22 in this case either via a non-illustrated power feed line in the guide rail 22 or an accumulator. In addition, in this embodiment of the invention, the electromagnets 36 of the guide rail 20 of FIG. 2 can be replaced correspondingly by a magnetizable material containing inhomogeneities and/or by permanent magnets and/or by closed electrically excitable coils and electromagnets, respectively.

Figure 5:
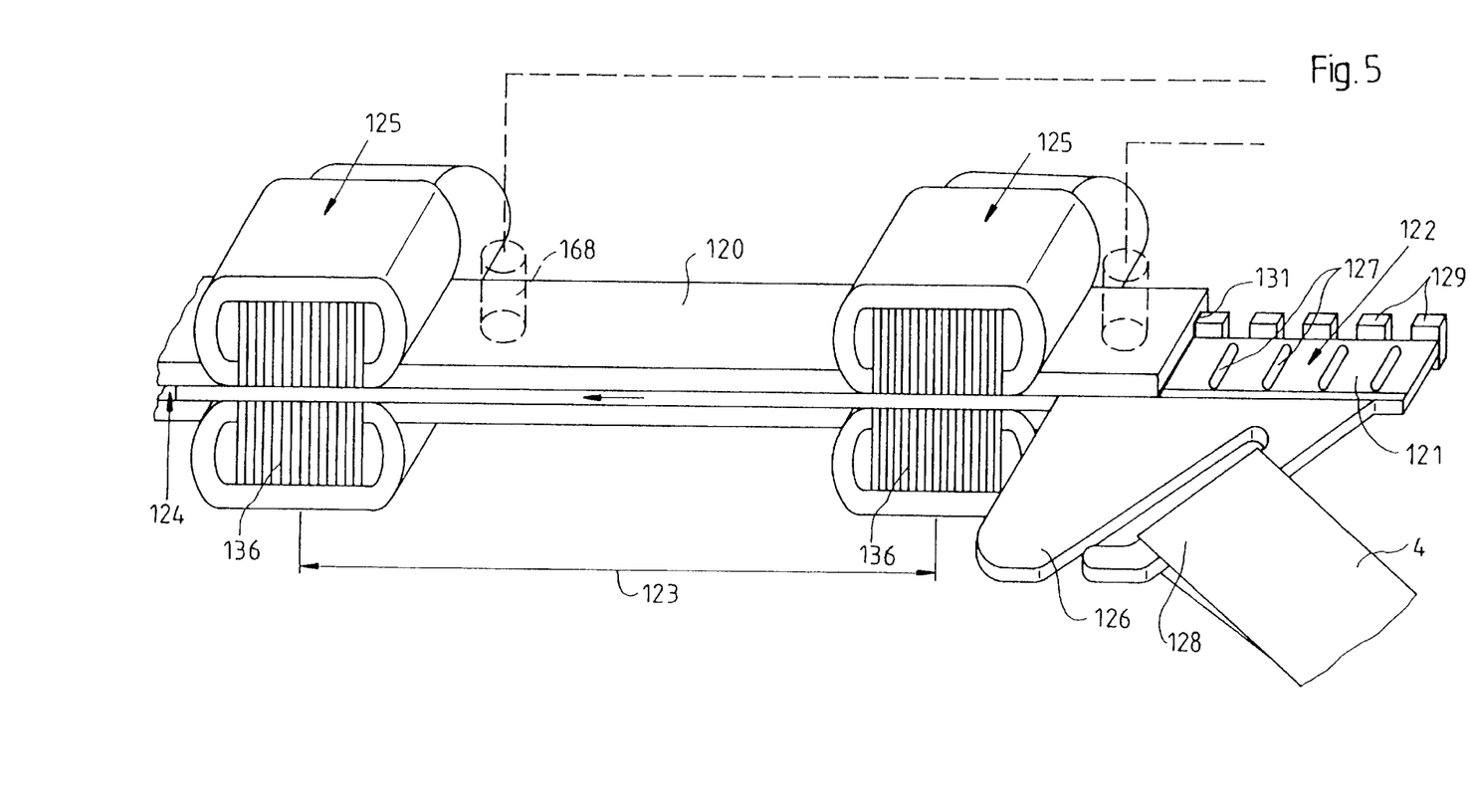
FIG. 5 is a diagrammatic and schematic elevational view of a further embodiment of the web-threading device according to the invention, wherein the pulling device is driven by drive stations arranged on the guide rail at a spaced distance from one another.

In further embodiments of the invention illustrated in FIGS. 5 to 9, the compact and short pulling device 22 according to FIGS. 2 and 3 is constructed by a guiding device which extends along a section 123 of the guide rail 120 and forms the rotor of the linear drive. As illustrated in FIG. 5, the ends of the sections 123 are bounded by drive stations 125, which contain the stators of the linear drive in the form of electrically excitable coils or electromagnets 136. The length of the pulling device 122 in this embodiment of the invention is slightly greater than the distance between two drive stations 125, i.e., greater than the length of a section 123. The pulling device 122 itself in this embodiment of the invention is preferably constructed as an elongated body 121 which can be matched to the profile of the guide rail 120, contains inhomogeneities in the form of openings 127 and is produced from a magnetizable material, for example, from transformer lamination or plate. In the same manner as in the aforedescribed embodiments according to FIGS. 2 and 3, the guide rail 120 has a longitudinal opening 124 from which there extends a projection 126 which is formed on the body 121 of the pulling device 122 and to which the leading end 128 of the web-shaped material 4 is fastened. As illustrated in FIG. 5, and in order to achieve better lateral guidance, one or more guide elements 129 can be provided on the body 121, the guide elements 129 being guided in a corresponding groove 131 formed in the guide rail 120. In this embodiment of the invention, the guide rail 120 thus has a substantially T-shaped inner space wherein the body 121, which is constructed in this embodiment as a flexible metal strip, for example, slides along with the guide elements 129 formed thereon.

Figures 6, 7:
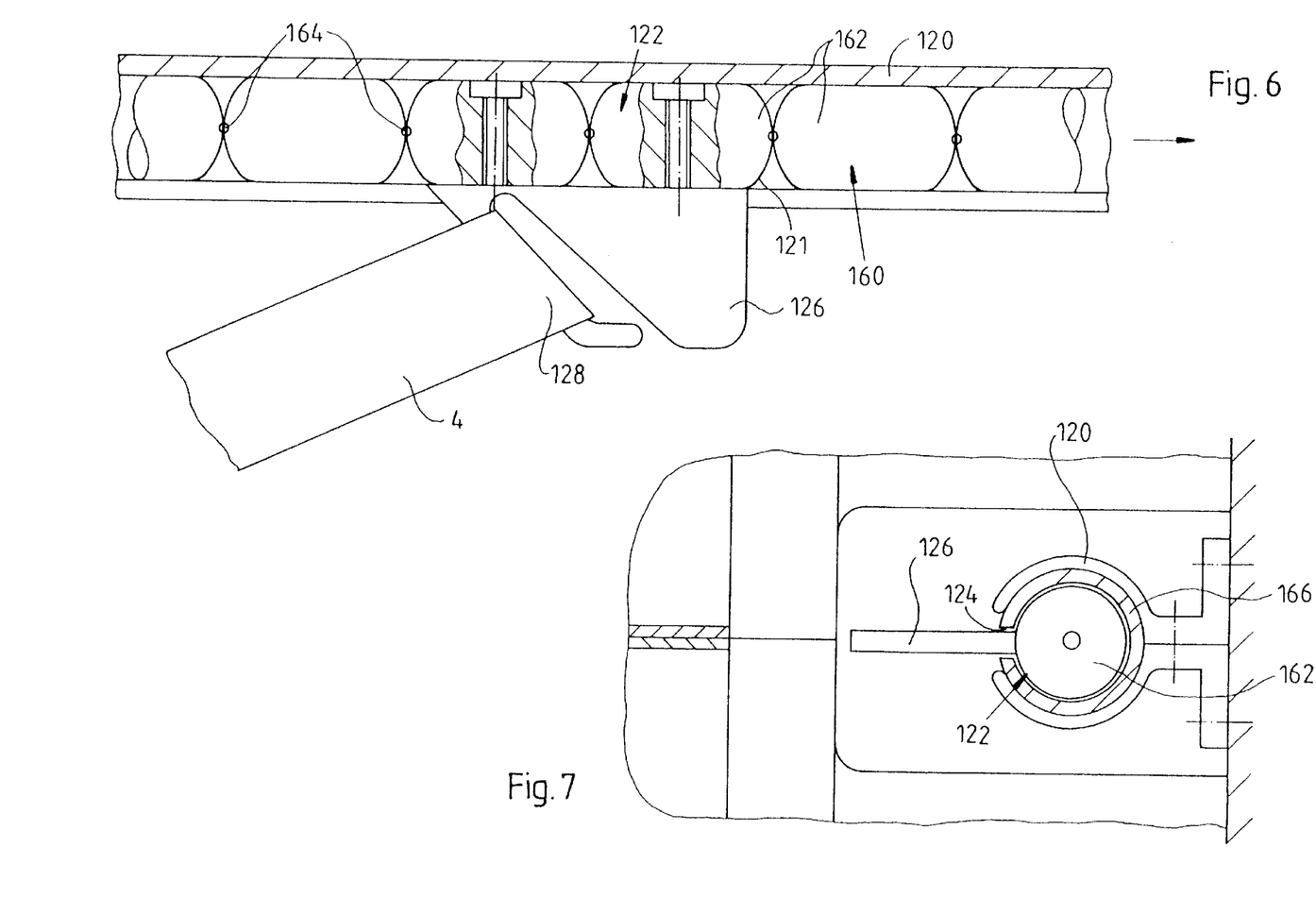
FIG. 6 is a fragmentary diagrammatic longitudinal sectional view of FIG. 5 showing the web-threading device with the guide rail and the pulling device provided therein.
FIG. 7 is a diagrammatic cross-sectional view of FIG. 5 showing the web-threading device according to the invention.

In further embodiments of the invention, which are illustrated, for example, in FIGS. 6 to 9, the body 121 of the pulling device 122 is formed of a link chain 160 having links 162 made of a magnetizable material and/or of permanent magnets. As shown in FIGS. 6 to 9, the links 162 are movably connected to one another via joints 164, and the projection 126 for receiving the leading end 128 of the web-shaped material 4 is fastened at the side to one or more of the chain links 162. In this embodiment of the invention, the guide rail 120 preferably has a circular cross section, as illustrated in FIG. 7, with a lateral longitudinal opening 124, from which the projection 126 projects laterally in the aforedescribed manner. In order to achieve improved guidance and improved capability of the chain links 162 to slide in the guide rail 120, provision can further be made to arrange a longitudinally slotted plastic tube 166 in the guide rail 120, the internal diameter of the plastic tube being slightly greater than the outer diameter of one of the chain links 162, the link chain 160 being guided in the plastic tube 166 with low friction. The joints 164 for connecting the links 162 are preferably constructed so that they permit movement only in a plane extending perpendicularly to the projection 126.

Figure 8:
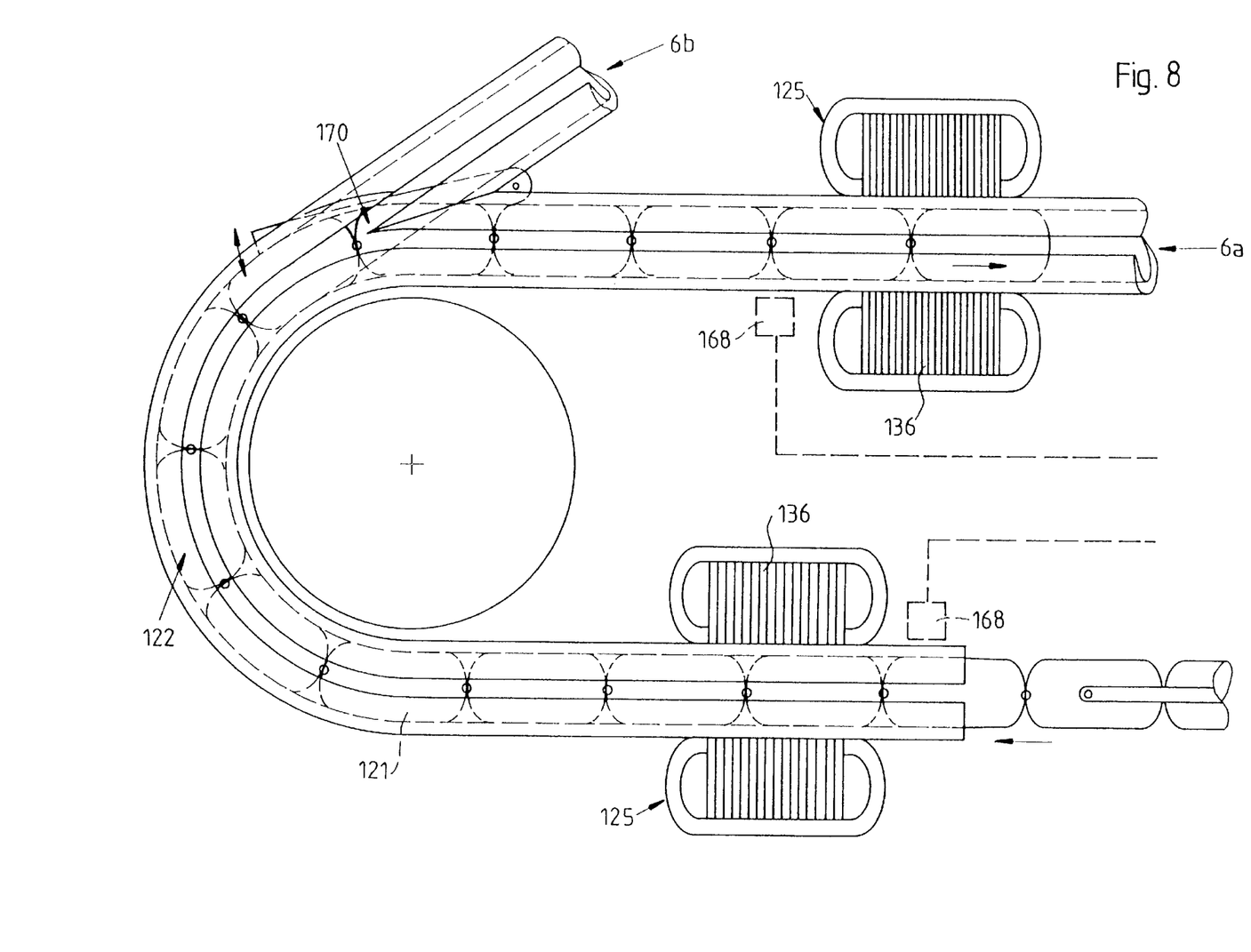
FIG. 8 is a diagrammatic and schematic elevational view of a first web path along which the pulling device of the web-threading device of FIG. 5 moves.
Figure 9:
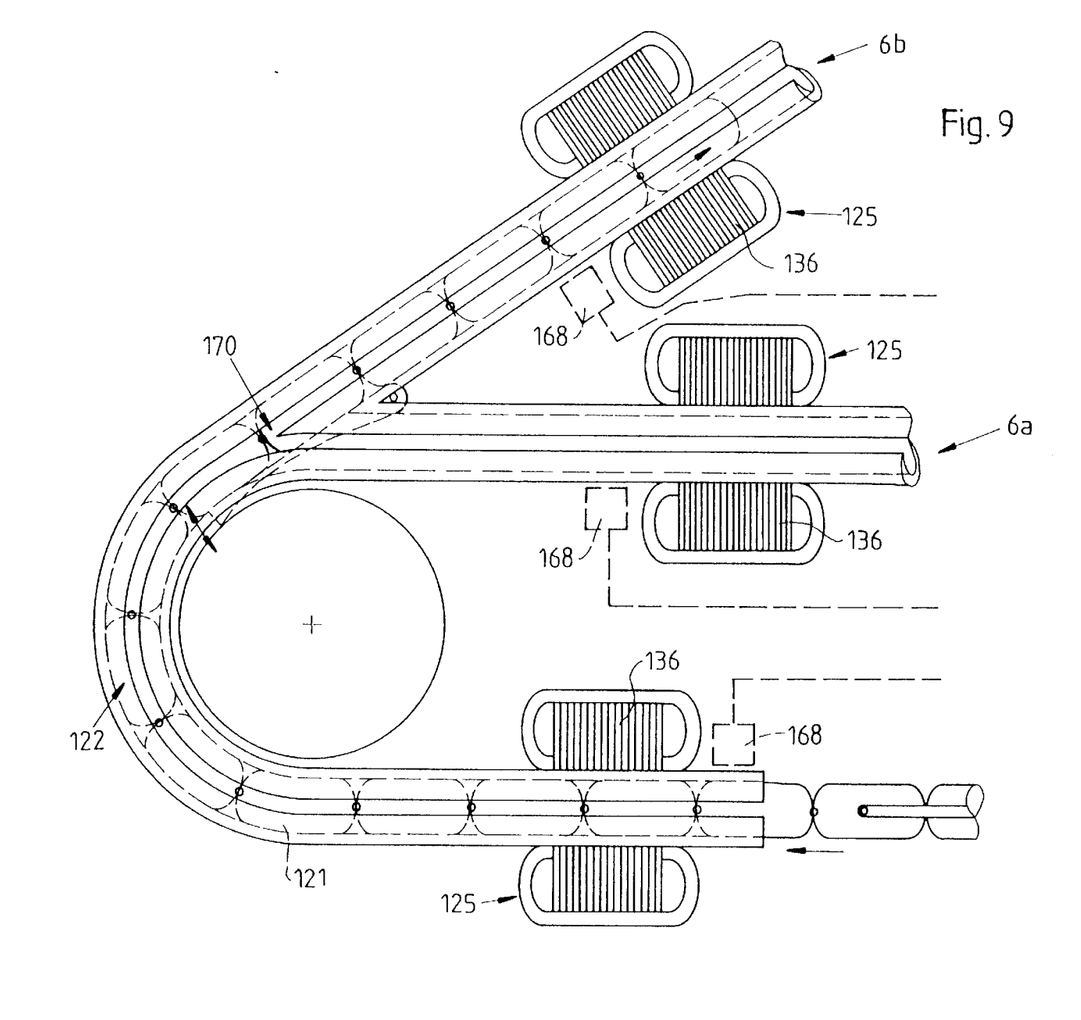
FIG. 9 is a view like that of FIG. 8, slightly reduced in size, and showings a further alternative web path along which the pulling device of the web-threading device according to FIG. 5 moves.

As illustrated in FIGS. 5, 8 and 9, the drive stations 125 are preferably arranged on mutually opposite sides of the guide rail 120, as a result of which the electromagnetic vertical forces acting upon the body 121 are compensated in an advantageous manner. The guidance of the body 121 in the guide rail 120 in the embodiments of the invention illustrated in FIGS. 5 to 9 is formed in such a way that, in spite of the flexibility of the body 121 of the pulling device 122, a well-defined air gap between the electromagnets 136 of the drive stations 125 and the body 121 of the pulling device 122 is ensured over the entire length of the web-threading device 2.

As in the case of the embodiments of the invention shown in FIGS. 2 and 3 and aforedescribed herein, in the embodiment according to FIGS. 5 to 8, all of the functional principles of a conventional linear drive can also be used. Thus, the linear drive, for example, in the case of the aforedescribed perforated, more flexible transformer lamination or plate, operates as a so-called reluctance motor and as a stepping motor, respectively, or in the case of the magnetic chain, as a synchronous or brushless DC motor. In the same manner as was described hereinbefore, it is also possible, in the embodiments according to FIGS. 5 to 9, for sensors 168 to be provided which detect the physical or local position and/or the speed of the pulling device 122 and to feed the detected values to a control device which controls the electromagnets 136 in the drive stations 125 via a corresponding converter in accordance with or as a function of the speed and/or of the physical or local position of the pulling device 122. In addition, it is possible for the drive stations 125 to be activated only when the pulling device 122 enters the respective working station 125 and, in a corresponding manner, for the working stations 125 to be deactivated after the end of the pulling device 122 has emerged from the corresponding working station 125.

Figure 4:
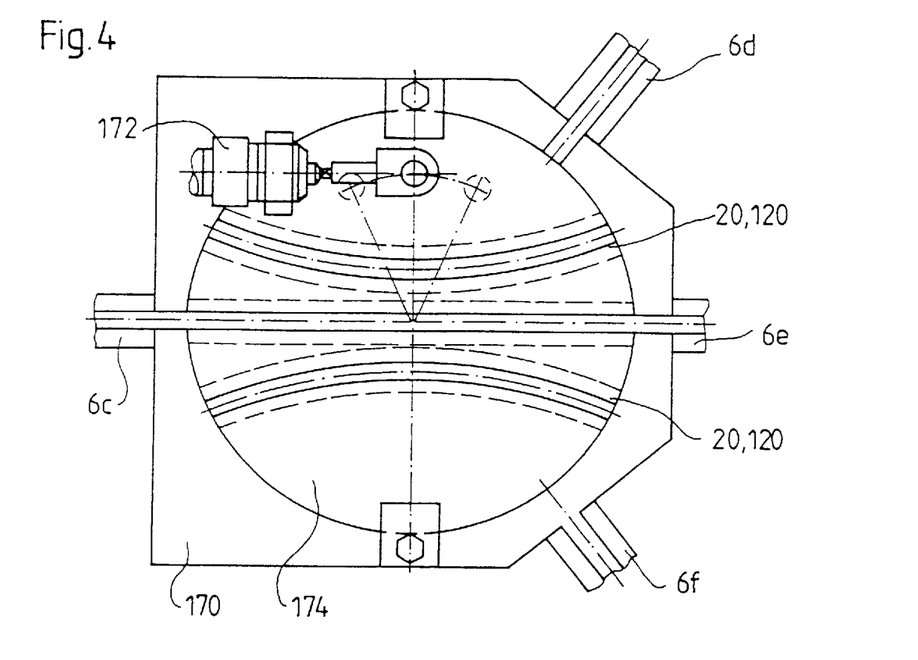
FIGS. 4 is a motor-adjustable switch for shifting between various paper paths in a web-fed rotary offset printing machine.

In order to be able to perform a threading or lead-in of the web-shaped material 4 along different web paths 6 within the printing machine 1, the web-threading device 2 according to the invention further has one or more switches 170 which, as shown in FIG. 4, have a disk 174 which can be rotated via an adjusting element 172, and on which there are arranged sections of the guide rail 20, 120 which are curved in different directions. Depending upon the rotational position of the disk 174, a pulling device 22, 122 running in along the web path 6c of FIG. 4 moves along the web path 6d, 6e or 6f. Thus, for example, as shown in FIGS. 8 and 9, the pulling device 122 can be moved either along the web path 6a, as shown in FIG. 8, or else along the web path 6b, as shown in FIG. 9, by suitably changing over the switch 170.

We claim:

1. A method of threading a material web into a machine for processing web-shaped material, which comprises driving a rail-guided pulling device by direct action of magnetic forces, and having the pulling device pull a web behind it.

2. A threading device for a machine for processing web-shaped material, having a guide rail extending at least sectionwise through the machine, comprising a pulling device movable along the guide rail for pulling a web behind it, and an electric linear drive for activating said pulling device.

3. The threading device according to claim 2, wherein said pulling device forms a rotor of said linear drive.

4. The threading device according to claim 2, including electrically excitable coils forming a stator of said linear drive, said coils being arranged along the guide rail.

5. The threading device according to claim 2, wherein said pulling device has at least one structural feature selected from the group thereof consisting of a magnetizable material containing inhomogeneities, permanent magnets and closed electrically excitable coils, so that when coils of the guide rail are excited, said pulling device is driven forward.

6. The threading device according to claim 2, wherein said pulling device has at least one coil for generating an alternating primary field.

7. The threading device according to claim 6, wherein the guide rail has at least one structural feature selected from the group thereof consisting of a magnetizable material with openings arranged therein, permanent magnets and electrically excitable coils so that when said at least one coil of said pulling device is excited, said pulling device is driven forward.

8. The threading device according to claim 6, including a power supply for said at least one coil of said pulling device, power being supplied thereby via an accumulator provided in said pulling device.

9. The threading device according to claim 6, including power supply lines disposed in the guide rail, said at least one coil of said pulling device being excitable via an electric contact actuatable by said pulling device and said power supply lines.

10. The threading device according to claim 2, wherein said pulling device is formed as a guiding device extending along a section of the guide rail, and including drive stations disposed sectionwise along the guide rail, said drive stations being provided with electrically excitable coils, said pulling device having a length slightly greater than a spaced distance between respective pairs of said drive stations.

11. The threading device according to claim 10, wherein said pulling device is formed with an elongated body matchable with the profile of the guide rail.

12. The threading device according to claim 10, wherein said pulling device has at least one structural feature selected from the group thereof consisting of a magnetizable material containing inhomogeneities, permanent magnets and closed coils electrically excitable by a primary field of said coils of said drive stations, so that when said coils of said drive stations are excited, said pulling device is driven forward.

13. The threading device according to claim 10, wherein said pulling device is formed as a link chain.

14. The threading device according to claim 13, wherein said link chain is formed exclusively of permanent magnets joined to one another by articulating joints.

15. The threading device according to claim 10, including a first detection device for activating a work station when said pulling device enters one of said drive stations, respectively.

16. The threading device according to claim 2, including a control device for controlling forward driving of said pulling device.

17. The threading device according to claim 16, including second detection devices provided along the guide rail, in accordance with the function of which the forward driving of said pulling device is controllable by said control device.

18. The threading device according to claim 2, including at least one switch by which said pulling device is guidable along different web paths.

19. The threading device according to claim 2, wherein the guide rail has a cross section which is selected from the group consisting of substantially C-shaped and T-shaped cross sections.

20. The threading device according to claim 2, including at least one structural feature selected from the groups consisting of rollers and guide surfaces provided in the guide rail for guiding said pulling device.

21. The threading device according to claim 4, wherein said coils are supplied by a voltage selected from the groups thereof consisting of AC and DC voltages.

22. The threading device according to claim 6, wherein said coils are supplied by a voltage selected from the groups thereof consisting of AC and DC voltages.

23. The threading device according to claim 10, wherein said coils are supplied by a voltage selected from the groups thereof consisting of AC and DC voltages.

24. The threading device according to claim 4, wherein said coils along the guide rail are activatable in sections, the respective section which is activated being exclusively the section wherein said pulling device is then located.

25. The threading device according to claim 4, wherein said stator is matched to a track profile of the guide rail.

* * * * *

UNITED STATES PATENT AND TRADEMARK OFFICE
CERTIFICATE OF CORRECTION

PATENT NO  : 5,809,892
DATED      : September 22, 1998
INVENTOR(S): Michael Kruger et al.

It is certified that error appears in the above-identified patent and that said Letters Patent is hereby corrected as shown below:

On the title page, item [75], should read as follows:

Michael Krüger, Edingen-Neckarhausen; Hans Jörg Laubscher, Neustadt-Gimmeldingen, both of Germany Signed and Sealed this Twelfth Day of January, 1999

Attest:

Attesting Officer

*Acting Commissioner of Patents and Trademarks*